United States Patent
Lin et al.

(10) Patent No.: US 12,235,473 B2
(45) Date of Patent: Feb. 25, 2025

(54) CURVED SHELL AND MANUFACTURING METHOD THEREOF

(71) Applicant: Coretronic Corporation, Hsin-Chu (TW)

(72) Inventors: Shih-Kan Lin, Hsin-Chu (TW); Chia-Tien Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 909 days.

(21) Appl. No.: 17/364,908

(22) Filed: Jul. 1, 2021

(65) Prior Publication Data

US 2022/0004019 A1    Jan. 6, 2022

(30) Foreign Application Priority Data

Jul. 3, 2020  (CN) .......................... 202010637249.9

(51) Int. Cl.
  *G02B 30/50*    (2020.01)
  *B29C 59/02*    (2006.01)
  (Continued)

(52) U.S. Cl.
  CPC ............ *G02B 30/50* (2020.01); *B29C 59/022* (2013.01); *G02B 1/11* (2013.01); *G02B 1/14* (2015.01);
  (Continued)

(58) Field of Classification Search
  CPC .......... G02B 27/18; G02B 1/11; G03B 21/60; G03B 21/606; G03B 21/62
  (Continued)

(56) References Cited

U.S. PATENT DOCUMENTS

| 8,256,904 B2 * | 9/2012 | Reichow ................. G09F 19/18 |
| | | 352/10 |
| 8,821,781 B2 | 9/2014 | Martin |

(Continued)

FOREIGN PATENT DOCUMENTS

| CN | 101650447 | 2/2010 |
| CN | 104460213 | 3/2015 |

(Continued)

OTHER PUBLICATIONS

Zhao, Jian Yong, "Projection Display Technology", Jan. 31, 2014, with partial English translation of pp. 68-69, National Defense Industry Press.

(Continued)

*Primary Examiner* — Wyatt A Stoffa
*Assistant Examiner* — Seth D Moser
(74) *Attorney, Agent, or Firm* — JCIPRNET (57) ABSTRACT

A curved shell, configured to receive a projection light beam provided by a projection device, and including a curved main body, a microstructure layer and multiple light-resistant layers is provided. The curved main body has an inner surface and an outer surface opposite to each other, and the outer surface has different curvatures. The microstructure layer is disposed on the outer surface and includes multiple first inclined surfaces and multiple second inclined surfaces distributed in alternation, and any two adjacent ones of the first inclined surfaces and the second inclined surfaces have an included angle. The light-resistant layers are disposed on the first inclined surfaces, wherein the light-resistant layers reflect or absorb ambient light beams from the outside of the curved main body, and the inner surface receives the projection light beam, and the projection light beam passes through the second inclined surfaces to form a projection image.

10 Claims, 9 Drawing Sheets

(51) Int. Cl.
*G02B 1/11* (2015.01)
*G02B 1/14* (2015.01)
*B29C 35/08* (2006.01)
*B29K 105/00* (2006.01)

(52) U.S. Cl.
CPC .. *B29C 35/0805* (2013.01); *B29C 2035/0827* (2013.01); *B29C 2059/023* (2013.01); *B29K 2105/0097* (2013.01)

(58) Field of Classification Search
USPC .................. 359/229, 601, 609, 613, 614
See application file for complete search history.

(56) References Cited

U.S. PATENT DOCUMENTS

| | | |
|---|---|---|
| 9,122,144 B2 | 9/2015 | Martin |
| 9,289,969 B2 | 3/2016 | Wang et al. |
| 9,885,947 B2 | 2/2018 | Wang et al. |
| 10,321,107 B2* | 6/2019 | Fuchs .................. H04N 9/3155 |
| 2007/0217004 A1 | 9/2007 | Smith et al. |
| 2012/0008201 A1* | 1/2012 | Shiau .................... G03B 21/60 |
| | | 427/163.3 |
| 2016/0161836 A1* | 6/2016 | Wang .................... G03B 21/606 |
| | | 425/102 |
| 2021/0026231 A1* | 1/2021 | Wang .................... G03B 21/60 |

FOREIGN PATENT DOCUMENTS

| | | |
|---|---|---|
| CN | 206712937 | 12/2017 |
| CN | 107703711 | 2/2018 |
| CN | 206991014 | 2/2018 |
| CN | 109814327 | 5/2019 |
| CN | 110297386 | 10/2019 |
| GB | 1331905 | 9/1973 |
| JP | H08211495 | 8/1996 |
| JP | 2002123183 | 4/2002 |
| JP | 2012159646 | 8/2012 |
| JP | 2013068771 | 4/2013 |
| JP | 2019211784 | 12/2019 |
| TW | M374077 | 2/2010 |
| TW | 201202837 | 1/2012 |
| TW | I469858 | 1/2015 |
| TW | I653497 | 3/2019 |

OTHER PUBLICATIONS

"Office Action of China Counterpart Application", issued on Aug. 18, 2023, p. 1-p. 12.

"Office Action of China Counterpart Application", issued on Jun. 14, 2022, p. 1-p. 10.

* cited by examiner

CURVED SHELL AND MANUFACTURING METHOD THEREOF

CROSS-REFERENCE TO RELATED APPLICATION

This application claims the priority benefit of China application serial no. 202010637249.9, filed on Jul. 3, 2020. The entirety of the above-mentioned patent application is hereby incorporated by reference herein and made a part of this specification.

BACKGROUND

Technical Field

The disclosure relates to a curved shell and a manufacturing method thereof, and particularly relates to an anti-reflective curved shell and a manufacturing method thereof.

Description of Related Art

At present, applications of projection technologies are more and more diversified, and one of them is the application to human body models. The human body model is usually a fixed dummy, and if human organs and other information are to be introduced to students, the above information cannot be displayed with dynamic effects and cannot be replaced at will. Regarding devices capable of dynamic display, currently there are only robots in which a flat-panel display is used as a head portion or abdomen. However, the flat-panel display may only display a flat image, which is different from the actual situation. Therefore, it is necessary to develop a technology that may implement projection on irregular curved surfaces.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to a curved shell, which is adapted to receive a projection light beam provided by a projection device, allows viewers to view a three-dimensional image projected to the curved shell by the projector from the front of the curved shell, and has an anti-reflective effect.

The invention provides a manufacturing method of a curved shell, which is adapted to manufacture the aforementioned curved shell.

The invention provides a curved shell, configured to receive a projection light beam provided by a projection device, the curved shell includes a curved main body, a microstructure layer and a plurality of light-resistant layers. The curved main body has an inner surface and an outer surface opposite to each other, and the outer surface has different curvatures. The microstructure layer is disposed on the outer surface and includes a plurality of first inclined surfaces and a plurality of second inclined surfaces distributed in alternation, and any two adjacent ones of the first inclined surfaces and the second inclined surfaces have an included angle. The light-resistant layers are disposed on the first inclined surfaces, wherein the light-resistant layers are configured to reflect or absorb ambient light beams from outside of the curved main body, the inner surface receives the projection light beam, and the projection light beam passes through the second inclined surfaces to form a projection image.

The invention provides a manufacturing method of a curved shell, and the method includes the following steps. A curved main body having an inner surface and an outer surface opposite to each other is provided. An adhesive layer is configured onto the outer surface. Imprinting is performed on the adhesive layer through a mold, so that the adhesive layer forms a microstructure layer. The microstructure layer includes a plurality of first inclined surfaces and a plurality of second inclined surfaces distributed in alternation, and any two adjacent ones of the first inclined surfaces and the second inclined surfaces have an included angle. The microstructure layer is cured. A plurality of light-resistant layers are configured on the first inclined surfaces.

The invention provides a manufacturing method of a curved shell, and the method includes the following steps. A film is disposed into a mold. The film includes a microstructure layer and a plurality of light-resistant layers, the microstructure layer includes a plurality of first inclined surfaces and a plurality of second inclined surfaces distributed in alternation, the light-resistant layers are disposed on the first inclined surfaces, and the second inclined surfaces are exposed from the light-resistant layers. A melted light-transmissive substrate is filled into the mold. The light-transmissive substrate contacts the microstructure layer. The light-transmissive substrate is cured to form a curved main body. The curved main body has an inner surface and an outer surface opposite to each other, the microstructure layer is fixed on the outer surface, and the first inclined surfaces and the second inclined surfaces are away from the outer surface.

Based on the above description, the curved main body of the curved shell of the invention has different curvatures on the outer surface, so as to be applied to models of different shapes to realistically display a three-dimensional image. Moreover, the microstructure layer is arranged on the outer surface of the curved main body. The projection light beam passes through the second inclined surfaces of the microstructure layer from the inner surface of the curved main body to form the projection image. The light-resistant layers are disposed on the first inclined surfaces of the microstructure layer to reflect or absorb the light beam from the outside of the curved main body to achieve an anti-reflective effect.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
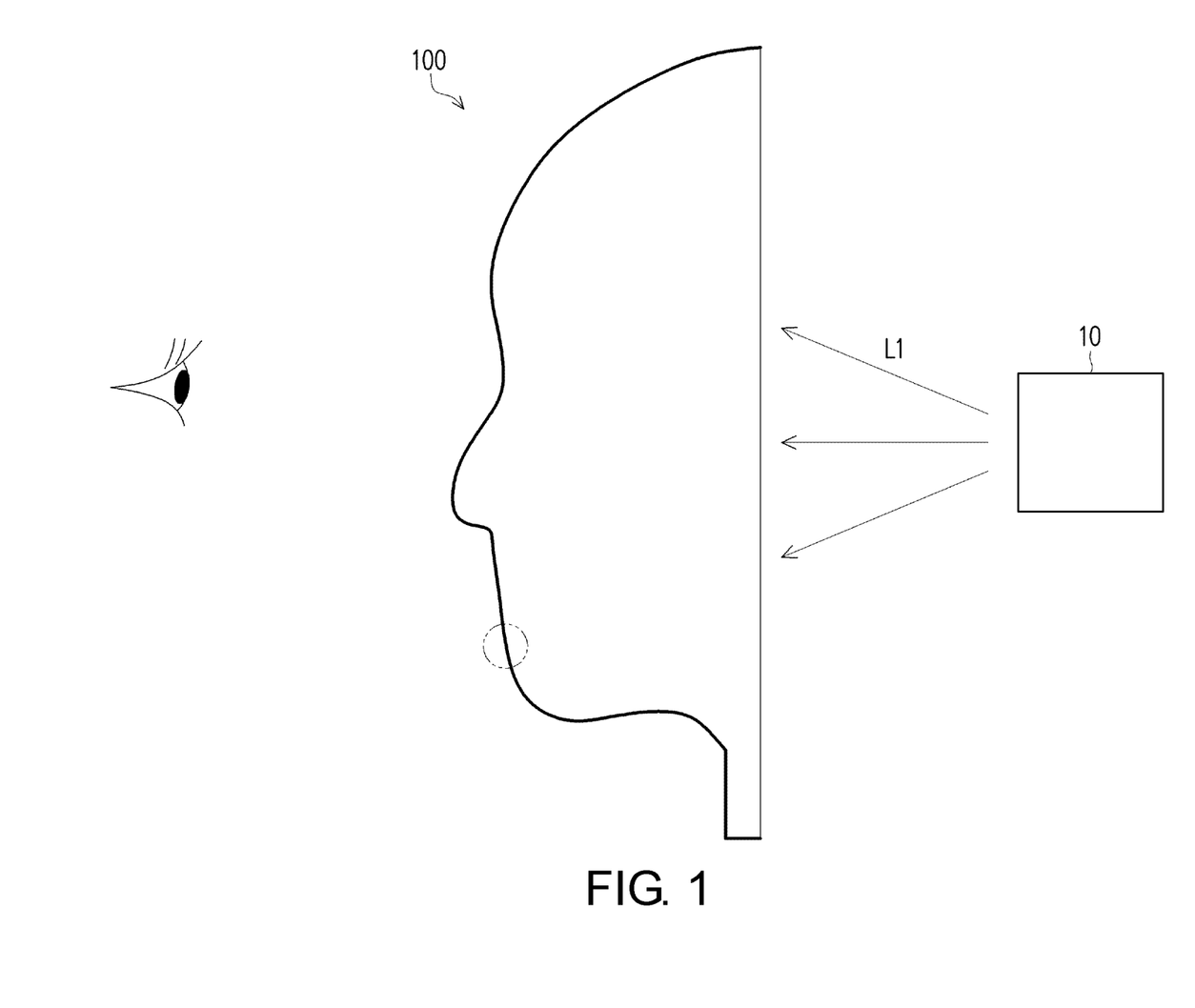
FIG. 1 is a schematic diagram of a projection device performing projection onto a curved shell according to an embodiment of the invention.

FIG. 1 is a schematic diagram of a projection device performing projection onto a curved shell according to an embodiment of the invention. Referring to FIG. 1, a curved shell 100 of the embodiment is configured to receive a projection light beam L1 provided by a projection device 10. A viewer may view an image imaged on the curved shell 100 on a front side of the curved shell 100. In the embodiment, the curved shell 100 has a special structure and may have an anti-reflective effect, and is configured to reflect or absorb ambient light beams from the outside (such as sunlight or indoor light beams), so as to improve viewing comfort and authenticity of the user, which is described in detail below.

Figure 2:
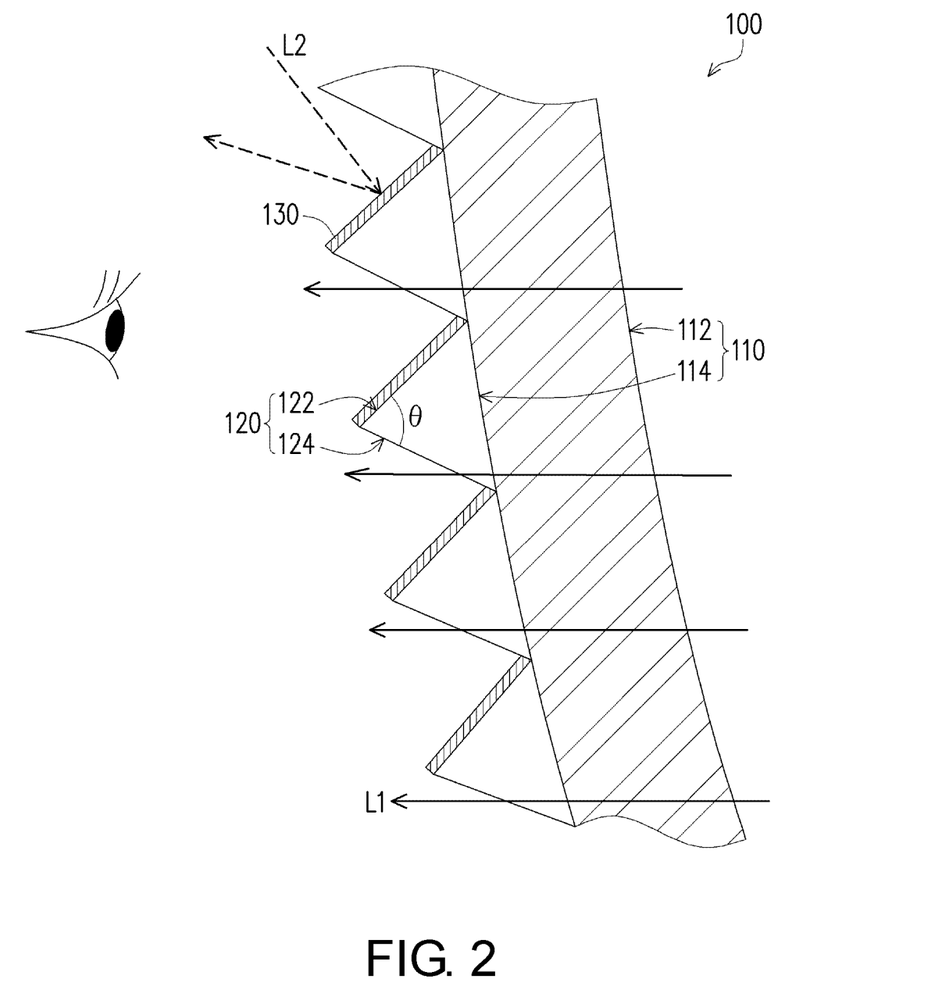
FIG. 2 is a partial schematic enlarged view of the curved shell of FIG. 1.

FIG. 2 is a partial schematic enlarged view of the curved shell of FIG. 1. Referring to FIG. 2, in the embodiment, the curved shell 100 includes a curved main body 110, a microstructure layer 120 and a plurality of light-resistant layers 130. The curved main body 110 includes an inner surface 112 and an outer surface 114 opposite to each other. A shape of the curved main body 110 may be a human body shape, a head shape, a face shape, or an animal shape. As shown in FIG. 1, in the embodiment, the shape of the curved main body 110 is, for example, a human face, and the curved main body 110 (especially the outer surface 114) has different curvatures to form an irregular surface. The curved main body 110 is, for example, made of plastic, which may be mixed with a diffusing agent and has a light diffusing property, but the invention is not limited thereto. The curved main body 110 may also be a holographic film, a projection film or a light instant film. In addition, the inner surface 112 is disposed between the outer surface 114 and the projection device 10, and the inner surface 112 is closer to the projection device 10 than the outer surface 114.

As shown in FIG. 2, in the embodiment, the microstructure layer 120 is disposed on the outer surface 114. In the embodiment, a cross-section of a microstructure presents a shape of a triangle, but the shape of the microstructure is not limited thereto. In other embodiments, the microstructure may also have a shape of a polygon such as a quadrangle and a pentagon, or an arc, a semicircle or an irregular shape, etc.

In the embodiment, the microstructure layer 120 includes a plurality of first inclined surfaces 122 and a plurality of second inclined surfaces 124 distributed in alternation, and any two adjacent ones of the first inclined surfaces 122 and the second inclined surfaces 124 have an included angle θ, which is an acute angle, but the invention is not limited thereto. In other embodiments, the included angle θ may be a right angle or an obtuse angle.

In the embodiment, the inner surface 112 of the curved main body 110 receives the projection light beam L1, and the projection light beam L1 passes through the second inclined surfaces 124 of the microstructure layer 120 to form a projection image.

It should be noted that an ambient light beam L2 (such as sunlight or an indoor light beam, etc.) from the outside of the curved main body 110 may illuminate from top to bottom. In the embodiment, the light-resistant layers 130 are, for example, reflective layers or light-absorbing layers. The light-resistant layers 130 are disposed on the first inclined surfaces 122 and may reflect or absorb the ambient light beam L2 from the outside of the curved main body 110. In this way, the projection image may be imaged on the curved shell 100, and the curved shell 100 has good anti-reflection property, so that the projection image may be more clear without being affected by the external ambient light beam, and the projection image may be more realistic and beautiful in color, so as to provide the viewers with a good usage experience.

It should be noted that since the first inclined surfaces 122 and the second inclined surfaces 124 of the microstructure layer 120 are extremely small in size, the sizes of the first inclined surfaces 122 and the second inclined surfaces 124 are, for example, 0.1 to 0.2 mm, and human eyes cannot observe a distribution of the first inclined surfaces 122 and the second inclined surface 124 on the curved shell 100. Therefore, continuity of the projection image on the curved shell 100 viewed by the human eyes is not affected.

Moreover, in the embodiment, the microstructure layer 120 may be distributed all over the outer surface 114 of the curved main body 110, but in other embodiments, the microstructure layer 120 may also be only on a part of the outer surface 114 of the curved main body 110, for example, on an upper half of the outer surface 114 of the curved main body 110, or on a relatively protruding part of the outer surface 114 of the curved main body 110, such as a forehead, a brow bone or a nose bridge, etc., but the invention is not limited thereto.

Figure 3:
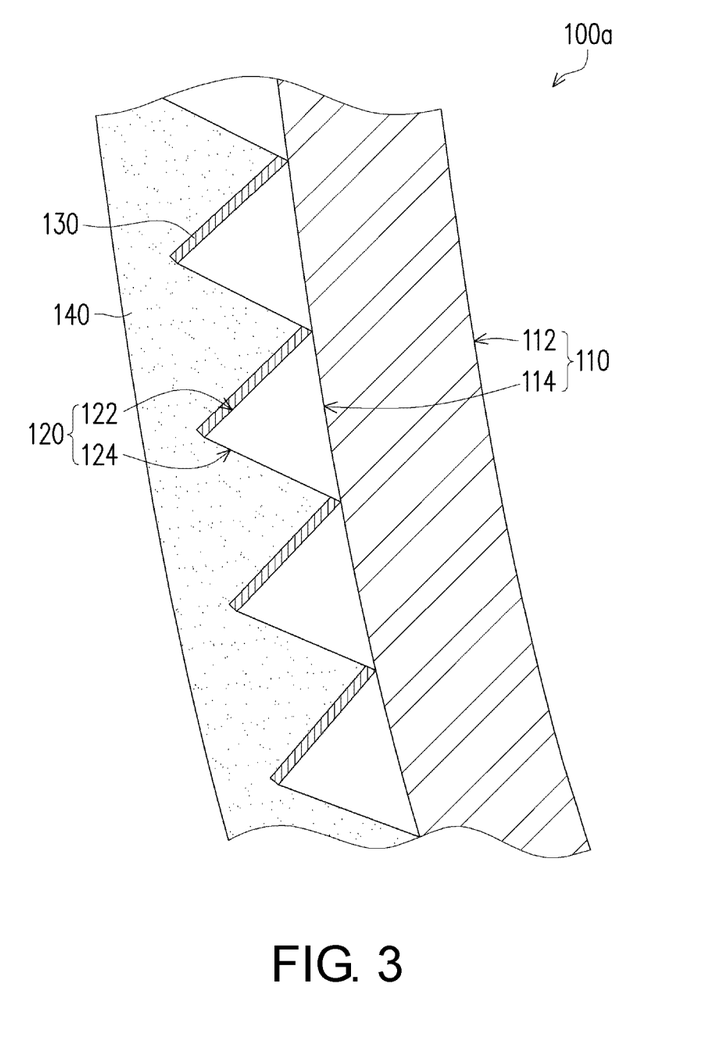
FIG. 3 is a partial schematic enlarged view of a curved shell according to another embodiment of the invention.

FIG. 3 is a partial schematic enlarged view of a curved shell according to another embodiment of the invention. Referring to FIG. 3, in the embodiment, the curved shell 100a further includes a protective layer 140 disposed on the microstructure layer 120 and the light-resistant layers 130, where a hardness of the protective layer 140 is greater than hardnesses of the microstructure layer 120 and the light-resistant layers 130. The protective layer 140 has characteristics of transparency and anti-scratch, and may well protect the microstructure layer 120 and the light-resistant layers 130 from scratch. The protective layer 140 is, for example, PET, and a thickness thereof is, for example, 0.03 mm to 0.13 mm, but the invention is not limited thereto. In addition, the protective layer 140 may also be coated with an additional anti-oil functional layer, etc.

FIG. 4A to FIG. 4E are schematic diagrams of a manufacturing method of the curved shell 100 according to another embodiment of the invention. FIG. 5 is a schematic flowchart of FIG. 4A to FIG. 4E. The manufacturing method of the curved shell 100 of the embodiment is to manufacture the curved shell 100 through nanoimprinting, and includes following steps. In step 210 shown in FIG. 4A and FIG. 5, the curved main body 110 is provided, the curved main body 110 includes the inner surface 112 and the outer surface 114 opposite to each other. The outer surface 114 of the curved main body 110 has different curvatures. In an embodiment, the curved main body 110 may also include an uneven surface or an irregular surface. In an embodiment, the inner surface 112 of the curved main body 110 has different curvatures corresponding to the outer surface 114 of the curved main body 110.

Figure 4A:
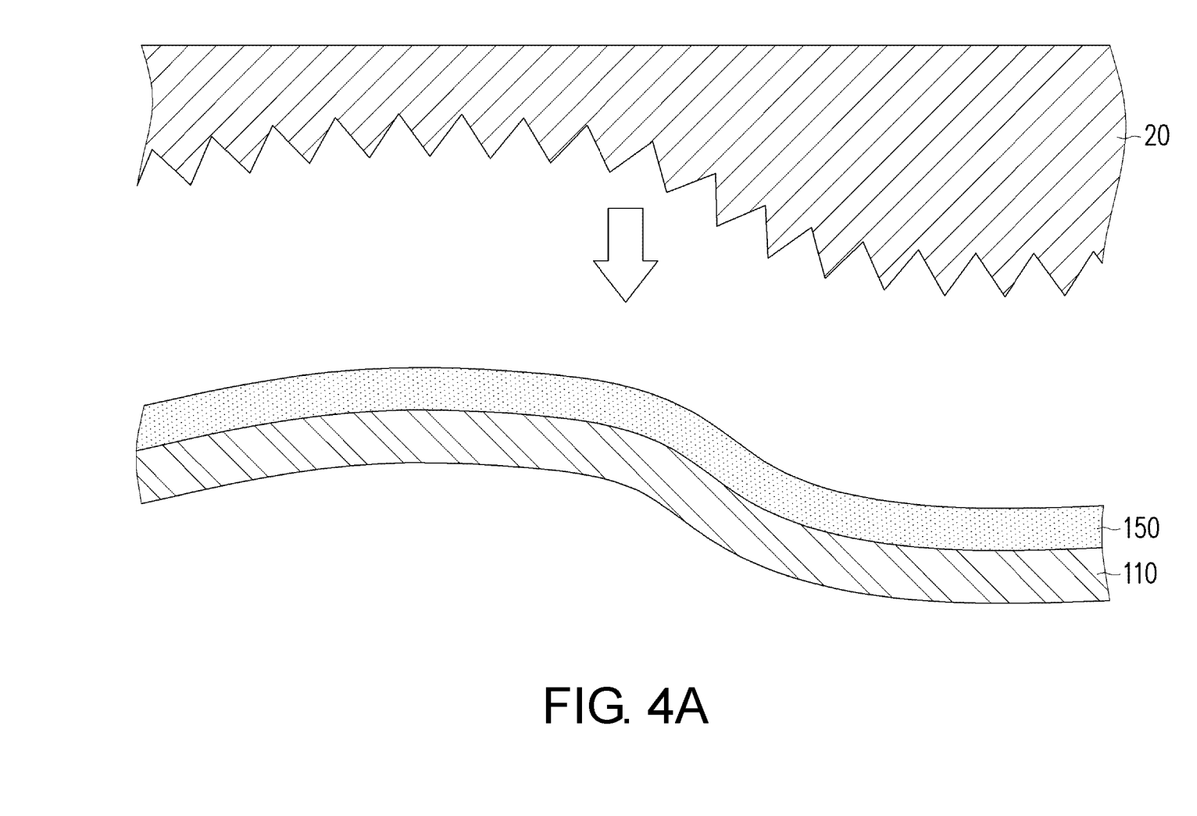
FIG. 4A to FIG. 4E are schematic diagrams of a manufacturing method of a curved shell according to another embodiment of the invention.
Figure 4B:
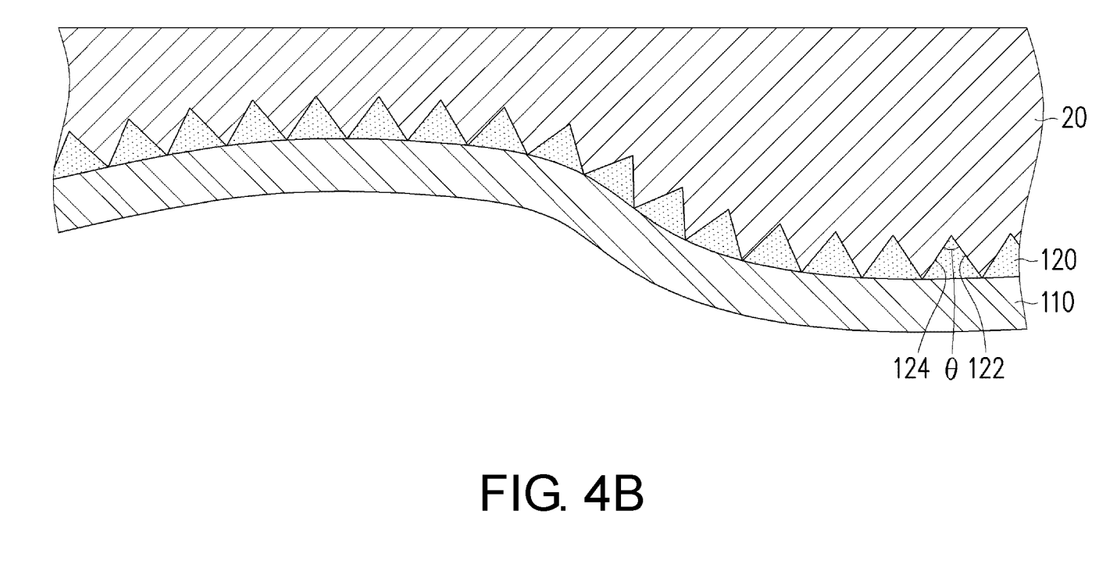
Figure 5:
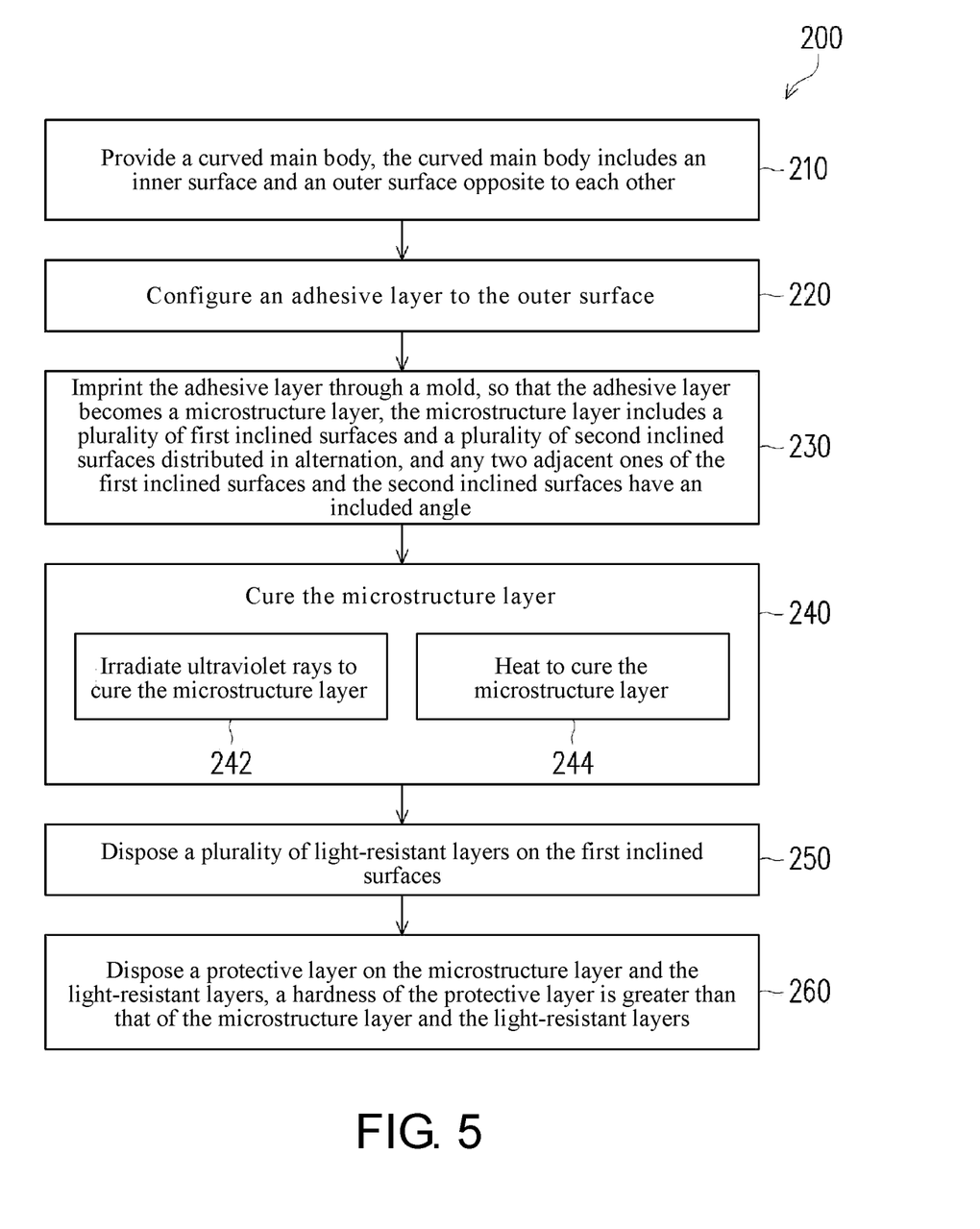
FIG. 5 is a schematic flowchart of FIG. 4A to FIG. 4E.

In step 220 of FIG. 4A and FIG. 5, an adhesive layer 150 is disposed on the outer surface 114 of the curved main body 110. The adhesive layer 150 is made of a light-transmitting material, and may be shaped through imprinting. Then, in step 230 of FIG. 4A, FIG. 4B and FIG. 5, the adhesive layer 150 is imprinted through a mold 20, so that the adhesive layer 150 forms the microstructure layer 120, the microstructure layer 120 includes a plurality of first inclined surfaces 122 and a plurality of second inclined surfaces 124 distributed in alternation, and any two adjacent ones of the first inclined surfaces 122 and the second inclined surfaces 124 have an included angle θ.

Referring to step 240 of FIG. 5, the microstructure layer 120 is cured. In an embodiment, if a light curing process is adopted, a transparent mold 20 may be used, the mold 20 is light transparent, and the step of curing the microstructure layer 120 further includes a step 242 of irradiating ultraviolet rays to cure the microstructure layer 120. Alternatively, in an embodiment, if thermal curing is adopted, the mold 20 may be a nickel mold, which is harder and resistant to high temperature, but the material of the mold 20 is not limited thereto. The step of curing the microstructure layer 120 further includes a step 244 of heating to cure the microstructure layer 120.

Figure 4C:
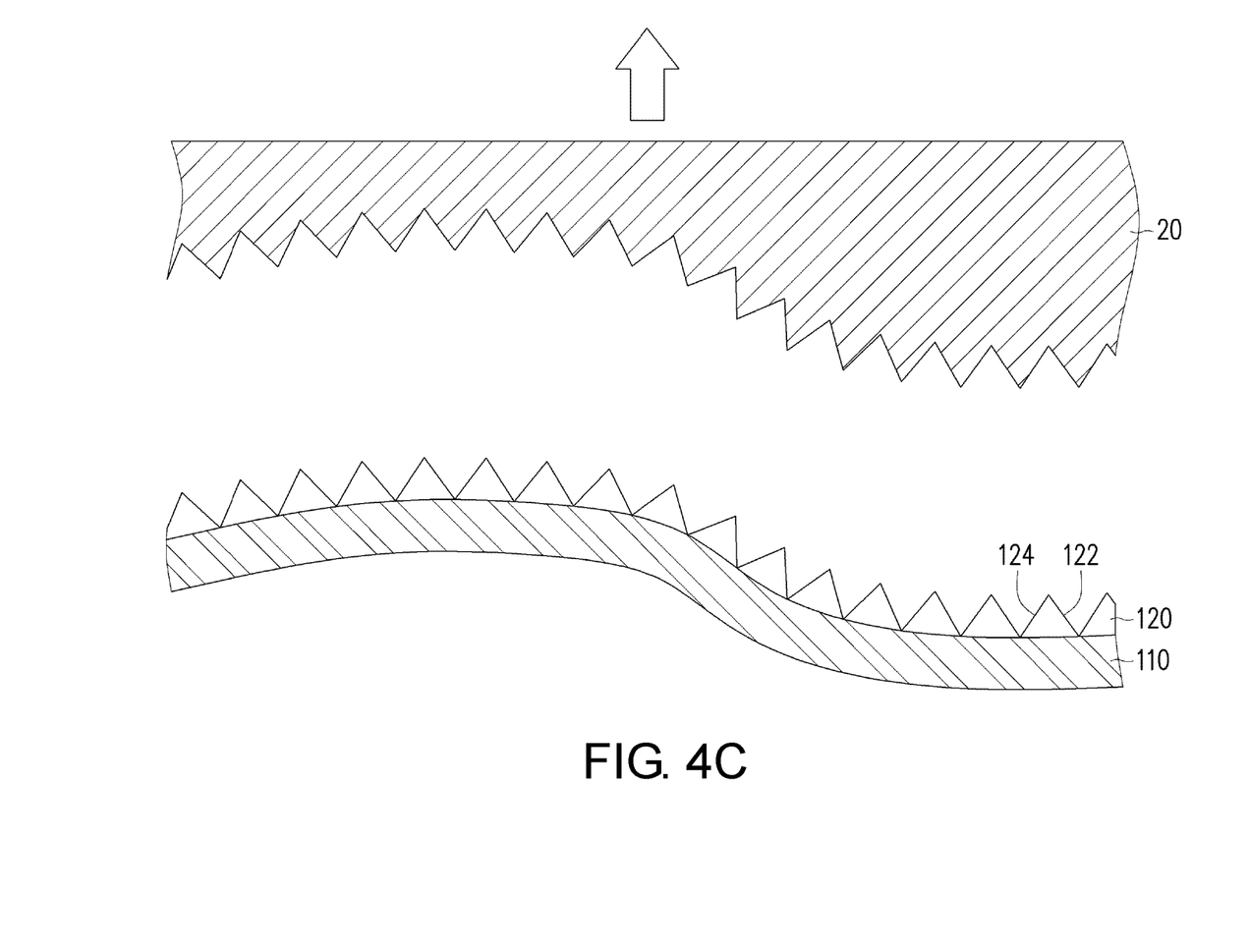
Figure 4D:
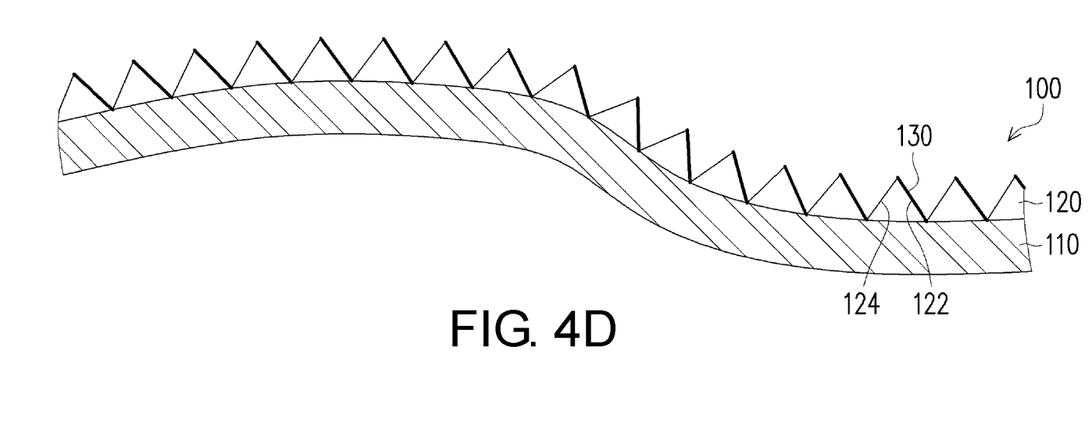

After the microstructure layer 120 is cured, as shown in FIG. 4C, the curved main body 110 with the microstructure layer 120 is demolded. Then, in step 250 of FIG. 4D and FIG. 5, a plurality of the light-resistant layers 130 are disposed on the first inclined surfaces 122. After the step 250 is completed, the curved shell 100 as shown in FIG. 2 may be manufactured.

Figure 4E:
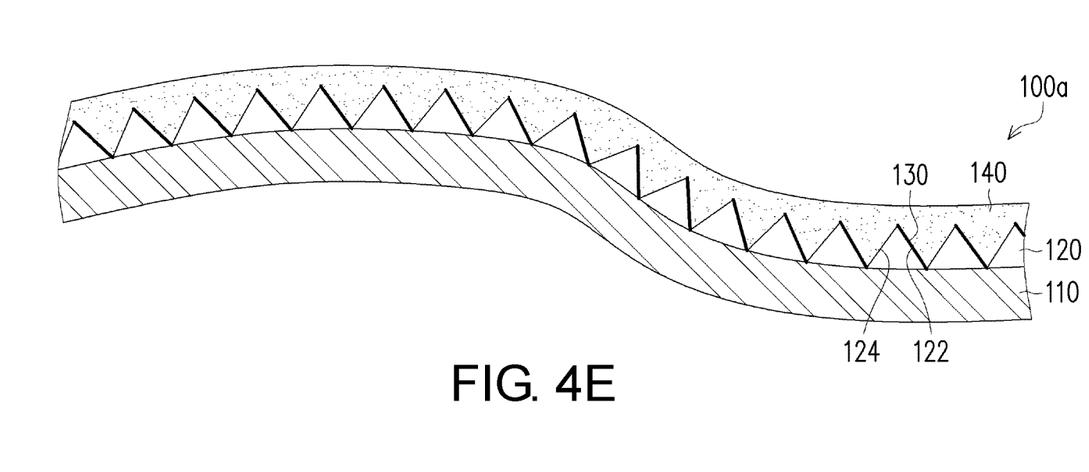

Moreover, in the embodiment, the manufacturing method 200 of the curved shell may further include step 260 of FIG. 4E and FIG. 5, where a protective layer 140 is disposed on the microstructure layer 120 and the light-resistant layers 130, the a hardness of the protective layer 140 is greater than hardnesses of the microstructure layer 120 and the light-resistant layers 130. After the step 260 is completed, the curved shell 100a as shown in FIG. 3 may be manufactured.

Figure 6:
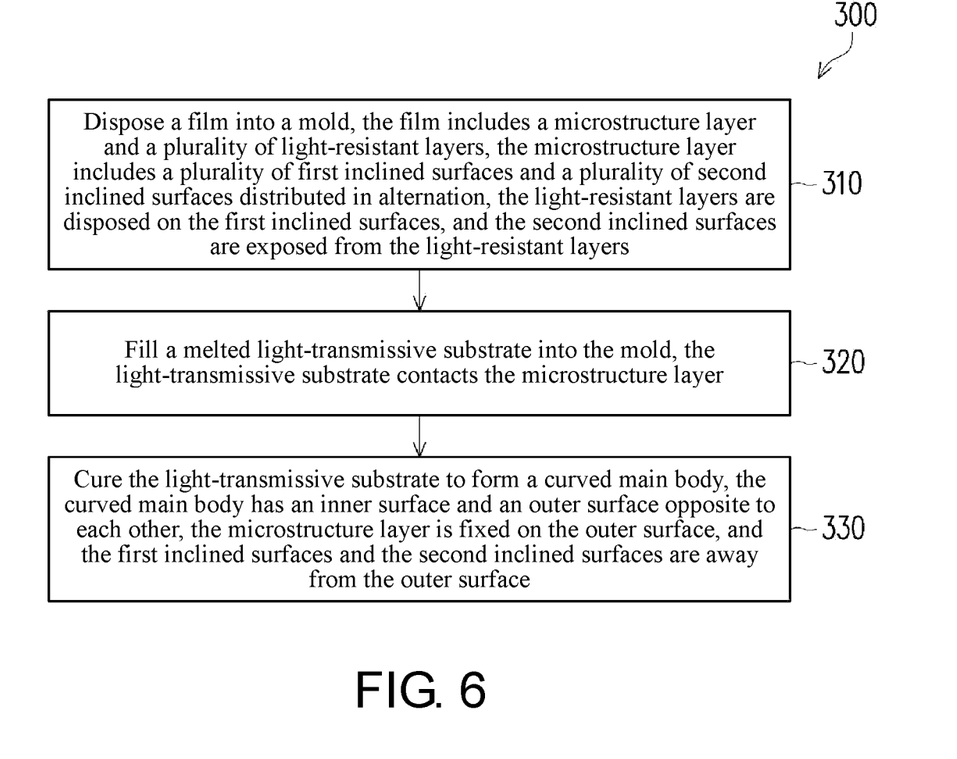
FIG. 6 is a schematic flowchart illustrating a manufacturing method of a curved shell according to another embodiment of the invention.

FIG. 6 is a schematic flowchart illustrating a manufacturing method of a curved shell according to another embodiment of the invention. Referring to FIG. 6, a manufacturing method 300 of a curved shell of the embodiment is to manufacture the curved shell 100 by means of in-mold transfer molding, which includes following steps. In step 310, a film is disposed into a mold. The mold may be a metal mold, and the film may be automatically conveyed and positioned by a feeder, but the invention is not limited thereto. The film includes the microstructure layer 120 and a plurality of the light-resistant layers 130 with reference of FIG. 2, and the microstructure layer 120 includes a plurality of first inclined surfaces 122 and a plurality of second inclined surfaces 124 distributed in alternation, the microstructure layer 120 may be made through electroforming or electric discharge engraving, etc. The light-resistant layers 130 are disposed on the first inclined surfaces 122, and the second inclined surfaces 124 are exposed from the light-resistant layers 130. Namely, the film having the microstructure layer 120 and the light-resistant layers 130 of FIG. 2 is directly manufactured first.

Then, in step 320, a melted light-transmissive substrate is filled into the mold, the light-transmissive substrate contacts a smooth surface of the microstructure layer 120. The light-transmissive substrate may be polycarbonate (PC), acrylonitrile-butadiene-styrene copolymer (ABS), a mixture of PC and ABS, thermoplastic elastomer (TPE), polystyrene (PS), polymethyl methyl acrylate (PMMA) or any material with good light transmittance.

Moreover, in step 330, the light-transmissive substrate is cured to form the curved main body 110, the curved main body includes the inner surface 112 and the outer surface 114 opposite to each other, the microstructure layer 120 is fixed on the outer surface 114, and the first inclined surfaces 122 and the second inclined surfaces 124 are away from the outer surface 114. A method of curing the light-transmissive substrate includes light curing or thermal curing. After the step 330 is completed, the curved shell 100 as shown in FIG. 2 may be manufactured.

If the curved shell 100a as shown in FIG. 3 is to be manufactured, in step 310, the film may include the microstructure layer 120, a plurality of the light-resistant layers 130, and the protective layer 140 of FIG. 3. The protective layer 140 is disposed on the microstructure layer 120 and the light-resistant layers 130, and the hardness of the protective layer 140 is greater than hardnesses of the microstructure layer 120 and the light-resistant layers 130. Then, such a film is subjected to steps 320 and 330, and the curved shell 100a as shown in FIG. 3 may be manufactured.

In summary, the curved main body of the curved shell of the invention has different curvatures on the outer surface, so that it may be applied to models of different shapes or irregular models, so as to display images realistically.

In addition, the microstructure layer is arranged on the outer surface of the curved main body. The projection light beam passes through the second inclined surfaces of the microstructure layer from the inner surface of the curved main body to form the projection image. The light-resistant layers are disposed on the first inclined surfaces of the microstructure layer to reflect or absorb the light beam from the outside of the curved main body to achieve the anti-reflective effect, so that the projection image may be more clear without being affected by the external ambient light beam, and the projection image may be more realistic and beautiful in color, so as to provide the viewers with a good usage experience.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A curved shell configured to receive a projection light beam provided by a projection device, the curved shell comprising a curved main body, a microstructure layer and a plurality of light-resistant layers, wherein
    the curved main body has an inner surface and an outer surface opposite to each other, and the outer surface has different curvatures,
    the microstructure layer is disposed on the outer surface and comprises a plurality of first inclined surfaces and a plurality of second inclined surfaces distributed in alternation, and any two adjacent ones of the first inclined surfaces and the second inclined surfaces have an included angle, and
    the light-resistant layers are disposed on the first inclined surfaces, wherein the light-resistant layers are configured to reflect or absorb ambient light beams from outside of the curved main body, the inner surface receives the projection light beam, and the projection light beam passes through the second inclined surfaces to form a projection image.

2. The curved shell as claimed in claim 1, further comprising:
    a protective layer disposed on the microstructure layer and the light-resistant layers, wherein a hardness of the protective layer is greater than hardnesses of the microstructure layer and the light-resistant layers.

3. The curved shell as claimed in claim 1, wherein a cross-section of the microstructure is in a triangular shape.

4. The curved shell as claimed in claim 1, wherein a shape of the curved main body is a human body shape, a head shape or an animal shape.

5. A manufacturing method of the curved shell according to claim 1, comprising:
    providing the curved main body having the inner surface and the outer surface opposite to each other;
    configuring an adhesive layer onto the outer surface;
    imprinting on the adhesive layer through a mold, so that the adhesive layer forms the microstructure layer, wherein the microstructure layer comprises the plurality of first inclined surfaces and the plurality of second inclined surfaces distributed in alternation, and any two adjacent ones of the first inclined surfaces and the second inclined surfaces have the included angle;
    curing the microstructure layer; and
    configuring the plurality of light-resistant layers on the first inclined surfaces.

6. The manufacturing method of the curved shell as claimed in claim 5, further comprising:
    configuring a protective layer on the microstructure layer and the light-resistant layers, wherein a hardness of the protective layer is greater than hardnesses of the microstructure layer and the light-resistant layers.

7. The manufacturing method of the curved shell as claimed in claim 5, wherein the mold is light-transmissive, and the step of curing the microstructure layer further comprises:
    irradiating an ultraviolet ray to cure the microstructure layer.

8. The manufacturing method of the curved shell as claimed in claim 5, wherein the step of curing the microstructure layer further comprises:
    heating to cure the microstructure layer.

9. A manufacturing method of the curved shell according to claim 1, comprising:
    disposing a film into a mold, wherein the film comprises the microstructure layer and the plurality of light-resistant layers, the microstructure layer comprises the plurality of first inclined surfaces and the plurality of second inclined surfaces distributed in alternation, the light-resistant layers are disposed on the first inclined surfaces, and the second inclined surfaces are exposed from the light-resistant layers;
    filling a melted light-transmissive substrate into the mold, wherein the light-transmissive substrate contacts the microstructure layer; and
    curing the light-transmissive substrate to form the curved main body, wherein the curved main body has the inner surface and the outer surface opposite to each other, the microstructure layer is fixed on the outer surface, and the first inclined surfaces and the second inclined surfaces are away from the outer surface.

10. The manufacturing method of the curved shell as claimed in claim 9, wherein the film further comprises a protective layer disposed on the microstructure layer and the light-resistant layers, and a hardness of the protective layer is greater than hardnesses of the microstructure layer and the light-resistant layers.

* * * * *